United States Patent
Iwamoto et al.

(10) Patent No.: US 10,583,745 B2
(45) Date of Patent: Mar. 10, 2020

(54) NON-CONTACT POWER TRANSMISSION SYSTEM

(71) Applicant: HONDA MOTOR CO., LTD., Minato-ku, Tokyo (JP)

(72) Inventors: Takuya Iwamoto, Wako (JP); Tomoaki Nakagawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 12 days.

(21) Appl. No.: 15/983,179

(22) Filed: May 18, 2018

(65) Prior Publication Data

US 2018/0339599 A1  Nov. 29, 2018

(30) Foreign Application Priority Data

May 24, 2017 (JP) .................. 2017-102399

(51) Int. Cl.
| | | |
|---|---|---|
| H02J 7/00 | (2006.01) | |
| B60L 11/18 | (2006.01) | |
| H02J 50/90 | (2016.01) | |
| H02J 50/12 | (2016.01) | |
| H02J 7/02 | (2016.01) | |
| B60L 53/12 | (2019.01) | |
| B60L 53/38 | (2019.01) | |
| H04B 5/00 | (2006.01) | |
| B60L 53/30 | (2019.01) | |

(Continued)

(52) U.S. Cl.
CPC .......... B60L 11/1829 (2013.01); B60L 53/12 (2019.02); B60L 53/305 (2019.02); B60L 53/36 (2019.02); B60L 53/38 (2019.02); H02J 7/025 (2013.01); H02J 50/12 (2016.02); H02J 50/90 (2016.02); H04B 5/0037 (2013.01); B60L 2250/16 (2013.01); H02J 50/80 (2016.02)

(58) Field of Classification Search
CPC .................................................... B60L 11/1829
USPC ........................................................ 320/108
See application file for complete search history.

(56) References Cited

U.S. PATENT DOCUMENTS

2012/0262002 A1* 10/2012 Widmer .................. B60L 53/65
                                                                    307/104
2015/0217648 A1*  8/2015 Ichikawa ................ H02J 7/025
                                                                    320/108

(Continued)

FOREIGN PATENT DOCUMENTS

| JP | 2015-074266 | 4/2015 |
|---|---|---|
| JP | 2015-104275 | 6/2015 |
| JP | 2015-126658 | 7/2015 |

(Continued)

OTHER PUBLICATIONS

Japanese Office Action for Japanese Patent Application No. 2017-102399 dated Nov. 20, 2018.

*Primary Examiner* — Yalkew Fantu
(74) *Attorney, Agent, or Firm* — Amin, Turocy & Watson, LLP

(57) ABSTRACT

A voltage detector detects an LPE voltage generated by a weak power that is received by a secondary coil. A tendency determination unit determines whether the voltage value that changes as an electric vehicle travels tends to increase or decrease. A display device and an acoustic device perform a first notification if the voltage value tends to increase, and a second notification if the voltage value tends to decrease.

7 Claims, 8 Drawing Sheets

(51) Int. Cl.
*B60L 53/36* (2019.01)
*H02J 50/80* (2016.01)

(56) References Cited

U.S. PATENT DOCUMENTS

| 2017/0001532 | A1* | 1/2017 | Taniguchi | B60L 11/1831 |
| 2017/0120765 | A1* | 5/2017 | Ichikawa | B60L 53/305 |

FOREIGN PATENT DOCUMENTS

| JP | 5937631 | 6/2016 |
| JP | 5966407 | 8/2016 |

\* cited by examiner

NON-CONTACT POWER TRANSMISSION SYSTEM

CROSS-REFERENCE TO RELATED APPLICATION

This application is based upon and claims the benefit of priority from Japanese Patent Application No. 2017-102399 filed on May 24, 2017, the contents of which are incorporated herein by reference.

BACKGROUND OF THE INVENTION

Field of the Invention

The present invention relates to a non-contact (contactless) power transmission system that transmits electric power between a primary coil and a secondary coil, particularly to a non-contact power transmission system that transmits a weak power from a power transmission side to a power reception side for aligning the primary coil and the secondary coil, and detecting a low power excitation (LPE) voltage that is generated between both ends of a resistor when the weak power is received.

Description of the Related Art

Along with development of electric vehicles such as electric automobiles and hybrid automobiles, a technique regarding non-contact charging for charging a battery of an electric vehicle without contact has been developed. For the efficient non-contact charging, accurate alignment is necessary for a primary coil provided for a charging station and a secondary coil provided for an electric vehicle.

For example, Japanese Patent No. 5966407 (paragraphs [0033], [0034], [0053]) discloses a device for aligning the primary coil and the secondary coil. This device calculates power transmission efficiency for transmitting power from the primary coil to the secondary coil, and shows a driver, in accordance with the power transmission efficiency, a direction where an electric vehicle should travel. The power transmission efficiency is calculated on the basis of information regarding the amount of power received by the secondary coil and the information always received by a communication device regarding the amount of power of the primary coil.

SUMMARY OF THE INVENTION

When troubles occur in the communication device, the device according to Japanese Patent No. 5966407 cannot calculate the power transmission efficiency and cannot perform the alignment of the primary coil and the secondary coil.

The present invention has been made in view of the above problem, and an object is to provide a non-contact power transmission system that can make the alignment state known, where the primary coil and the secondary coil have been aligned, without calculating the power transmission efficiency.

According to the present invention, a non-contact power transmission system for transmitting power without contact from a primary coil that is provided for a charging station to a secondary coil that is provided for an electric vehicle includes: a primary side control unit configured to transmit to the primary coil a weak power for aligning the primary coil and the secondary coil; a voltage detector configured to detect voltage generated by the weak power that is received by the secondary coil; a tendency determination unit configured to determine whether a value of the voltage that changes as the electric vehicle travels tends to increase or decrease; and a notification device configured to perform a first notification if the value of the voltage is larger than a predetermined value and tends to increase, and a second notification if the value of the voltage is larger than the predetermined value and tends to decrease.

By the above structure, when the primary coil and the secondary coil are aligned, the first notification is performed if the voltage value generated by the weak power tends to increase, and the second notification is performed if the voltage value tends to decrease. Therefore, the alignment state, where the primary coil and the secondary coil have been aligned can be notified, without the calculation of the power transmission efficiency.

In the present invention, the notification device may include an acoustic device configured to output a first sound if the value of the voltage tends to increase, and a second sound if the value of the voltage tends to decrease.

By the above structure, the alignment state where the primary coil and the secondary coil have been aligned can be notified with a sound.

In the present invention, the notification device may include a display device configured to output a first display if the value of the voltage tends to increase, and a second display if the value of the voltage tends to decrease.

By the above structure, the alignment state where the primary coil and the secondary coil are aligned can be notified by displaying.

In the present invention, a distance sensor configured to detect a travel distance of the electric vehicle may be further included and the tendency determination unit may be configured to calculate, on the basis of the value of the voltage detected by the voltage detector and the travel distance of the electric vehicle detected by the distance sensor, a positional derivative that represents an amount of change of the value of the voltage with respect to an infinitesimal travel distance, and determine whether the value of the voltage tends to increase or decrease on the basis of the positional derivative.

By the above structure, a change tendency of the voltage value can be determined through a simple procedure of, for example, calculating the positional derivative of the voltage value.

According to the present invention, a non-contact power transmission system for transmitting a charging power without contact from a primary coil that is provided for a charging station to a secondary coil that is provided for an electric vehicle includes: a primary side control unit configured to transmit to the primary coil, a weak power for aligning the primary coil and the secondary coil; a voltage detector configured to detect voltage generated by the weak power that is received by the secondary coil; a distance sensor configured to detect a travel distance of the electric vehicle; a secondary side control unit configured to calculate, on the basis of a value of the voltage detected by the voltage detector and the travel distance of the electric vehicle detected by the distance sensor, a positional derivative that represents an amount of change of the value of the voltage with respect to an infinitesimal travel distance; and a notification device configured to, if the value of the voltage is larger than a predetermined value, perform different notifications before and after the positional derivative becomes zero.

By the above structure, when the primary coil and the secondary coil are aligned, different notifications before and after the voltage value generated by the weak power takes a maximum value are performed. Therefore, the alignment state where the primary coil and the secondary coil have been aligned can be notified without the calculation of the power transmission efficiency.

According to the present invention, the alignment state where the primary coil and the secondary coil have been aligned can be notified without the calculation of the power transmission efficiency.

The above and other objects features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Description will hereinafter be made of a preferred embodiment of a non-contact power transmission system according to the present invention in detail with reference to the drawings.

[1 Structure of Non-Contact Power Transmission System 10]

Figure 1:
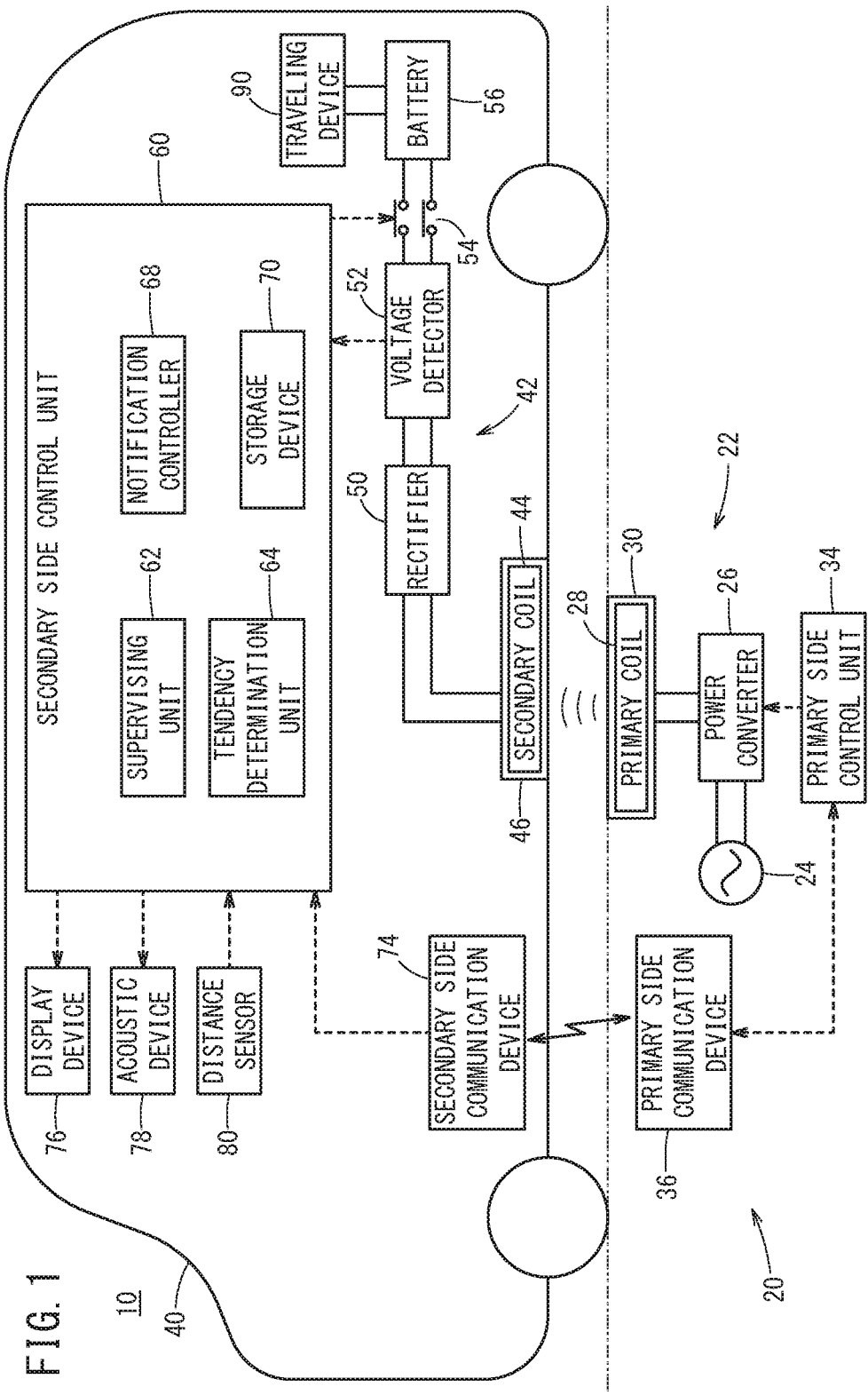
FIG. 1 is a system structure diagram that illustrates a non-contact power transmission system according to an embodiment.

A structure of a non-contact power transmission system 10 according to the present embodiment will be described with reference to FIG. 1. The non-contact power transmission system 10 includes a charging station 20 on a primary side (power transmission side) that is provided on the ground (installation surface), and an electric vehicle 40 on a secondary side (power reception side). In FIG. 1, components below a two-dot chain line correspond to the charging station 20, and components above the two-dot chain line correspond to the electric vehicle 40. In the non-contact power transmission system 10, a battery 56 that is mounted on the electric vehicle 40 is charged by the charging station 20 without contact.

The charging station 20 mainly includes a power transmission circuit 22, a primary side control unit 34, and a primary side communication device 36. The power transmission circuit 22 includes an alternating current power source 24, a power converter 26 that converts an alternating current power supplied from the alternating current power source 24 into a transmission power, a primary capacitor for resonance (not shown), and a primary coil 28. The primary coil 28 is covered with a primary pad 30 and disposed on the ground (installation surface).

The primary side control unit 34 functions as a predetermined operation unit by a processor such as a CPU (not shown) reading out programs stored in a storage device (not shown) and executing the programs. In the present embodiment, the primary side control unit 34 functions as a power transmission controller that transmits to the primary coil 28 a weak power for aligning the primary coil 28 and a secondary coil 44 and a charging power for charging the battery 56.

The primary side communication device 36 is connected to the primary side control unit 34 through a communication line. The primary side communication device 36 performs a wireless communication with a secondary side communication device 74 of the electric vehicle 40. For example, a wireless communication such as Wi-Fi (trademark) and Bluetooth (trademark) can be used.

The electric vehicle 40 mainly includes a power reception circuit 42, the battery 56, a secondary side control unit 60, the secondary side communication device 74, a display device 76, an acoustic device 78, a distance sensor 80, and a traveling device 90.

The power reception circuit 42 includes a secondary capacitor for resonance (not shown), the secondary coil 44, a rectifier 50 that rectifies a reception power which is the alternating current power received by the secondary coil 44, and a contactor 54 that switches electrical connection and disconnection between the power reception circuit 42 and the battery 56. The secondary coil 44 is covered with a secondary pad 46 and disposed on a lower surface of the electric vehicle 40.

The power reception circuit 42 further includes a voltage detector 52 that can be connected between the rectifier 50 and the contactor 54. The voltage detector 52 includes a parallel circuit including a predetermined resistor and a predetermined voltage sensor (neither are shown) as described in Japanese Patent No. 5937631, for example. The voltage sensor detects voltage that is generated between both ends of the resistor when the weak power is received. This voltage is referred to as an LPE voltage. When the weak power is received and a switching device (not shown) performs a switching operation upon receiving the control instruction from the secondary side control unit 60, the voltage detector 52 is connected to the power reception circuit 42. In this embodiment, the LPE voltage is detected using the power reception circuit 42 that is used in charging. However, a circuit for detecting the LPE voltage may be provided separate from the power reception circuit 42 and in the circuit, the rectifier 50 and the voltage detector 52 may be provided.

The battery 56 includes a lithium ion battery or the like. When the contactor 54 is in a connected state to make the primary coil 28 and the secondary coil 44 magnetically coupled, the battery 56 is charged through the power reception circuit 42.

The secondary side control unit 60 is an ECU and manages a power reception process. The secondary side control unit 60 functions as a supervising unit 62, a tendency determination unit 64, and a notification controller 68 by a processor such as a CPU (not shown) reading out programs stored in a storage device 70 and executing the programs.

The supervising unit 62 governs the power reception process. On the basis of a value of the LPE voltage, V_LPE (hereinafter, this value is referred to as voltage value V_LPE) detected by the voltage detector 52 and a travel distance X of the electric vehicle 40 detected by the distance sensor 80, the tendency determination unit 64 calculates the amount of change of the voltage value V_LPE with respect to an infinitesimal travel distance X (travel distance X per unit time), that is, a positional derivative dV/dX with respect to the LPE voltage. Then, on the basis of the positional derivative dV/dX, a tendency (increasing, decreasing, no change) of change of the voltage value V_LPE is determined. When the secondary coil 44 approaches the primary coil 28, the voltage value V_LPE generally increases; therefore, the positional derivative dV/dX is positive. When the secondary coil 44 separates from the primary coil 28, the voltage value V_LPE generally decreases; therefore, the positional derivative dV/dX is negative. When the primary coil 28 and the secondary coil 44 are aligned, the voltage value V_LPE does not change; therefore, the positional derivative dV/dX is zero. The notification controller 68 outputs an instruction signal in accordance with the tendency of change of the voltage value V_LPE determined by the tendency determination unit 64, and causes the display device 76 and the acoustic device 78 to notify whether the secondary coil 44 is approaching or separating from the primary coil 28.

The secondary side communication device 74 is connected to the secondary side control unit 60 through a communication line. The secondary side communication device 74 performs the wireless communication with the primary side communication device 36 of the charging station 20 as described above.

The display device 76 displays on a screen 76a (see FIG. 6B, etc.) information that indicates whether the secondary coil 44 is approaching or separating from the primary coil 28, in accordance with an instruction signal output from the secondary side control unit 60. The acoustic device 78 outputs to a speaker 78a (see FIG. 6B, etc.) the information that indicates whether the secondary coil 44 is approaching or separating from the primary coil 28, in accordance with the instruction signal output from the secondary side control unit 60.

The traveling device 90 includes a driving force device that generates a driving force in accordance with an occupant's operation of an accelerator pedal. The traveling device 90 further includes a steering device that steers the vehicle in accordance with an occupant's operation of a steering wheel, and a braking device that generates a braking force in accordance with an occupant's operation of a brake pedal. The driving force device includes an electric motor as a driving source to which the battery 56 supplies power.

[2 Voltage Value-Horizontal Distance Characteristic]

Figure 2:
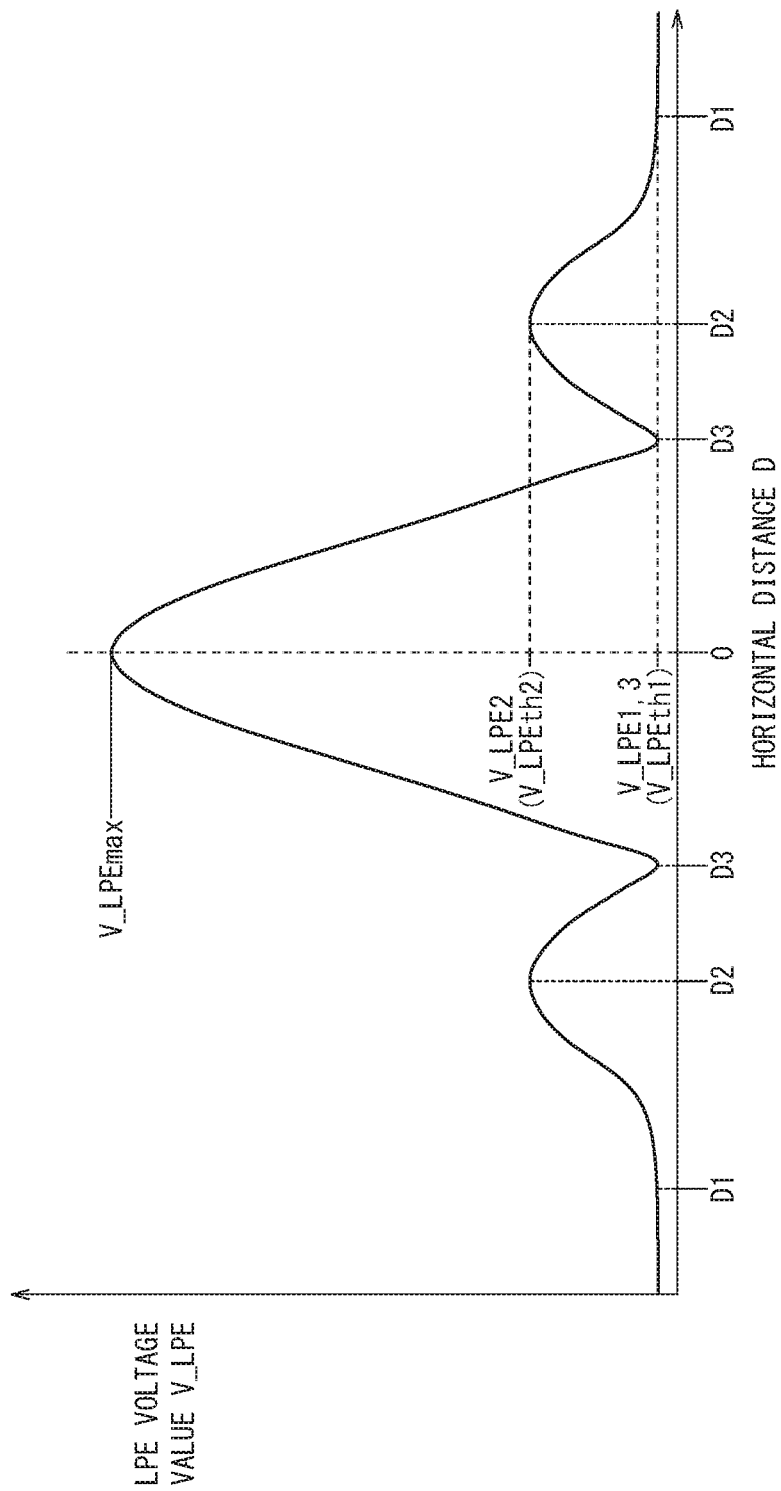
FIG. 2 is a diagram that represents a voltage value-horizontal distance characteristic.

It is assumed that the secondary coil 44 horizontally moves approximately straight toward a place above the primary coil 28 as the electric vehicle 40 travels. In this case, there is a relation as shown in FIG. 2 between the voltage value V_LPE detected by the voltage detector 52, and a horizontal distance D between the primary coil 28 and the secondary coil 44.

That is to say, when the electric vehicle 40 approaches the primary coil 28 from a distance and reaches a position (horizontal distance D=D1) at which the secondary coil 44 can receive the weak power transmitted from the primary coil 28, the voltage value V_LPE starts to increase from a first predetermined value V_LPE1. As the electric vehicle 40 travels and the horizontal distance D decreases, the voltage value V_LPE gradually increases so that the voltage value V_LPE takes a local maximum value V_LPE2 at a position of the horizontal distance D=D2. As the electric vehicle 40 travels further and the horizontal distance X decreasesn, the voltage value V_LPE gradually decreases so that the voltage value V_LPE takes a local minimum value V_LPE3 at a position of the horizontal distance D=D3. As the electric vehicle 40 travels much further and the horizontal distance X decreases, the voltage value V_LPE gradually increases so that the voltage value V_LPE takes a maximum value V_LPEmax at a position of the horizontal distance D=0; that is, when the center of the secondary coil 44 has come closest to the place above the center of the primary coil 28.

[3 Aligning Process]

When the primary coil 28 and the secondary coil 44 are aligned, an occupant can perform rough alignment by looking at the position of the primary coil 28 in advance. However, if the sight of the primary coil 28 is blocked under the electric vehicle 40, it is difficult to perform accurate alignment of the primary coil 28 and the secondary coil 44, particularly accurate alignment in the longitudinal direction of the electric vehicle 40. In the present embodiment, whether the secondary coil 44 is approaching or separating from the primary coil 28 is determined by detecting the tendency of change of the voltage value V_LPE, and the determination result is notified to the occupant.

Figure 3:
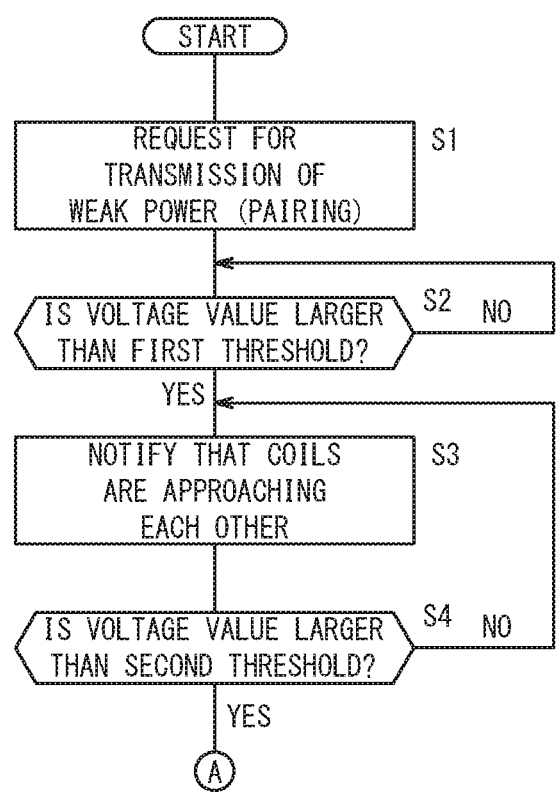
FIG. 3 is a flowchart that represents a process performed in an electric vehicle.
Figure 4:
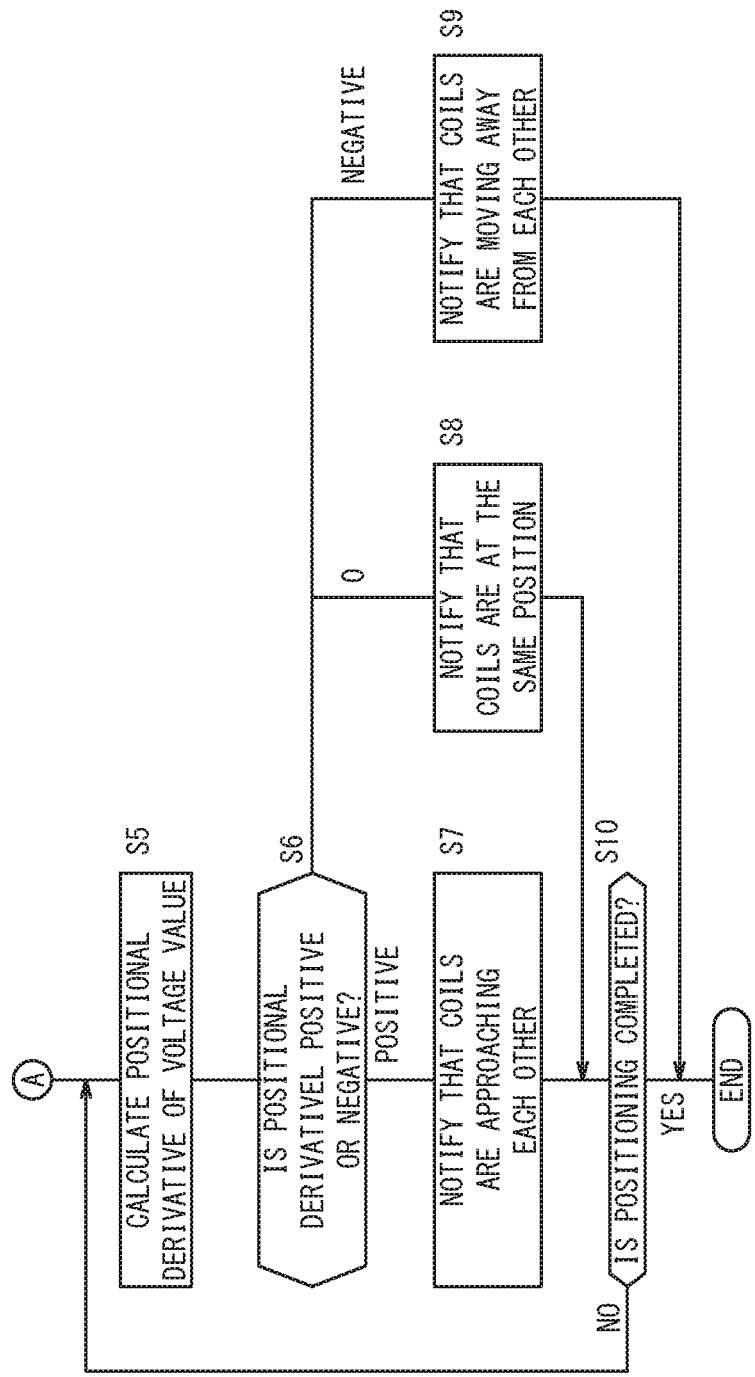
FIG. 4 is a flowchart that represents the process performed in the electric vehicle.
Figure 5:
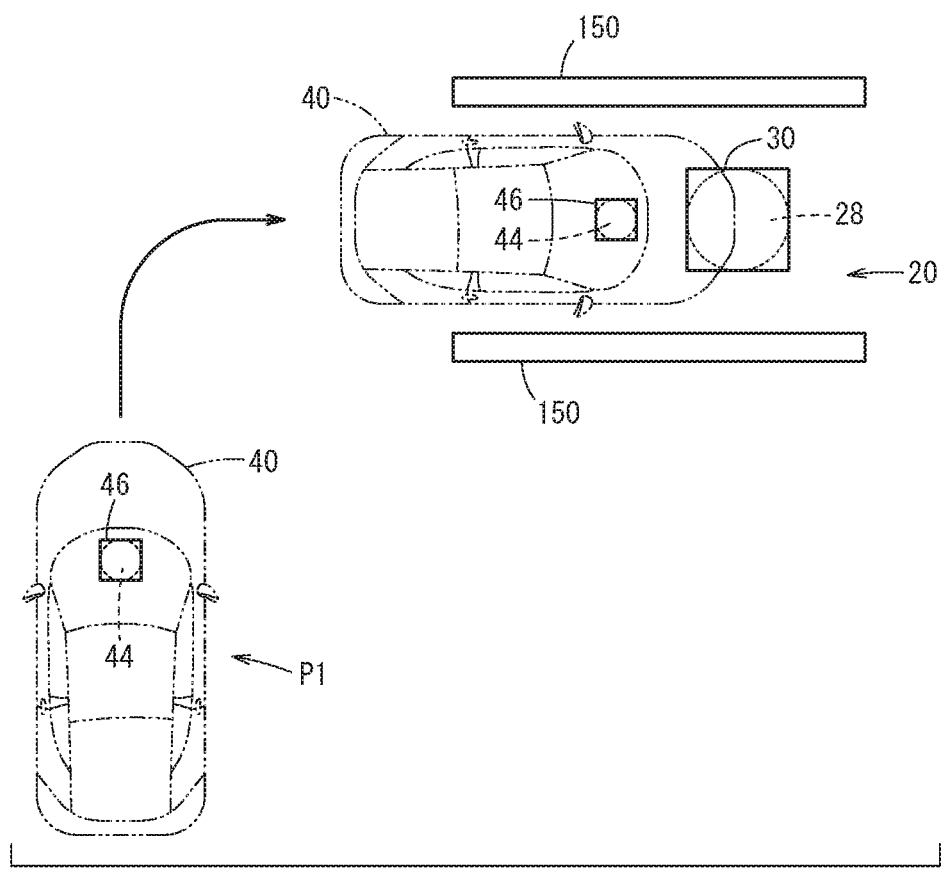
FIG. 5 is an explanatory diagram for describing an operation of parking the electric vehicle with respect to a charging station.

An alignment process performed on the electric vehicle 40 side according to the present embodiment is explained mainly with reference to FIG. 3 and FIG. 4. A process described below is performed when the occupant of the electric vehicle 40 turns on a parking start switch (not shown). As illustrated FIG. 5, the charging station 20 is sectioned off by lines 150. The occupant turns on the parking start switch at a position P1 that is away from the charging station 20 so that the electric vehicle 40 travels toward the charging station 20. An operation signal of the parking start switch is transmitted to the secondary side control unit 60.

In step S1, the supervising unit 62 instructs the secondary side communication device 74 to request the transmission of the weak power. The secondary side communication device 74 performs pairing, such as authentication, with the primary side communication device 36 and transmits a transmission request signal to request for the weak power. The primary side control unit 34 controls the power converter 26 in accordance with the transmission request signal received by the primary side communication device 36 to start the power transmission. The power converter 26 converts the alternating current power supplied from the alternating current power source 24 into a predetermined weak power and supplies the weak power to the primary coil 28. Then, the weak power for alignment is transmitted from the primary coil 28 to the outside.

The occupant identifies the positional relation between the primary coil 28 and the secondary coil 44 by a measurement with eyes, and drives the electric vehicle 40 so that the primary coil 28 and the secondary coil 44 come roughly close to each other. As the primary coil 28 and the secondary coil 44 get closer to each other, the horizontal distance D changes in the order of D1, D2, and D3 as shown in FIG. 2, and in accordance with this change, the voltage value V_LPE detected by the voltage detector 52 also changes.

In step S2, the supervising unit 62 determines whether the voltage value V_LPE detected by the voltage detector 52 is larger than a first threshold V_LPEth1, that is, whether the electric vehicle 40 enters a notification target range. In the present embodiment, the first predetermined value V_LPE1 shown in FIG. 2 is set as the first threshold V_LPEth1. If the voltage value V_LPE is larger than the first threshold V_LPEth1 (step S2: YES), the process advances to step S3. On the other hand, if the voltage value V_LPE is smaller than or equal to the first threshold V_LPEth1 (step S2: NO), the process in step S2 is repeated.

Figure 6A:
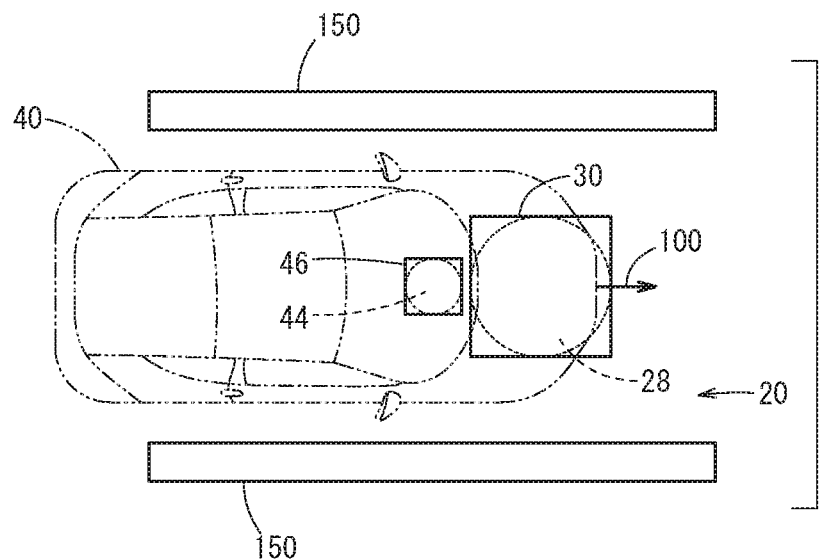
FIG. 6A is a state explanatory diagram that illustrates a state where a primary coil and a secondary coil are approaching each other.
Figure 6B:
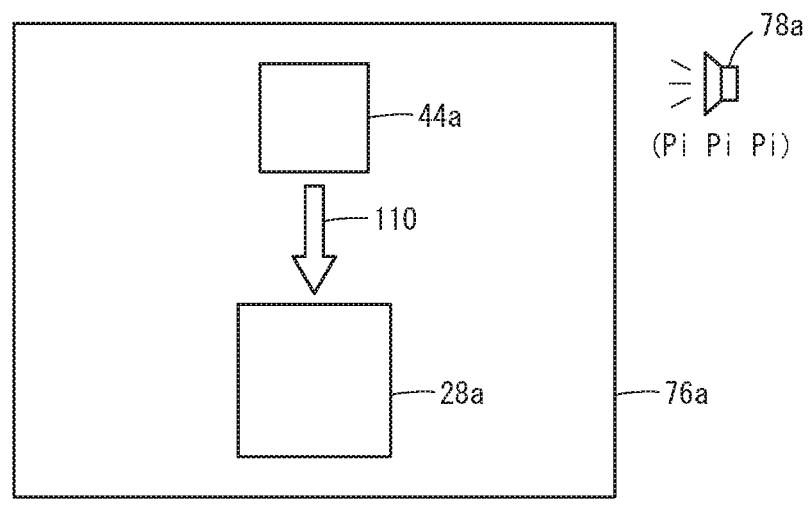
FIG. 6B is a schematic diagram that schematically represents a notification state in the state illustrated in the FIG. 6A.

When the process has advanced from step S2 to step S3, the notification controller 68 outputs to the display device 76 and the acoustic device 78 the instruction signal that notifies that the primary coil 28 and the secondary coil 44 are approaching each other. As illustrated in FIG. 6B, the display device 76 displays on the screen 76a an icon 28a of the primary coil 28 and an icon 44a of the secondary coil 44, and moreover, an icon 110 indicating that the primary coil 28 and the secondary coil 44 are approaching each other. As illustrated in FIG. 6B, the acoustic device 78 outputs an electronic sound indicating that the primary coil 28 and the secondary coil 44 are approaching each other (for example, electronic sound with long intervals) from the speaker 78a. The process advances to step S4.

In step S4, the supervising unit 62 determines whether the voltage value V_LPE detected by the voltage detector 52 is larger than a second threshold V_LPEth2, that is, whether the electric vehicle 40 has entered a range in which the determination is performed by using the positional derivative dV/dX. In the present embodiment, the local maximum value V_LPE2 shown in FIG. 2 is set as the second threshold V_LPEth2. Note that the voltage value-horizontal distance characteristic varies depending on various conditions. Thus, it is preferable to select the local maximum value V_LPE2 that is a maximum among a plurality of characteristics, and store the selected local maximum value V_LPE2 as a threshold V_LPEth in the storage device 70. If the voltage value V_LPE is larger than the second threshold V_LPEth2 (step S4: YES), the process advances to step S5. On the other hand, the voltage value V_LPE is less than or equal to the second threshold V_LPEth2 (step S4: NO), the process returns to step S3.

When the process has advanced from step S4 to step S5, the tendency determination unit 64 calculates the positional derivative dV/dX on the basis of the voltage value V_LPE detected by the voltage detector 52 and the travel distance X per unit time detected by the distance sensor 80. The process advances to step S6.

Figure 7A:
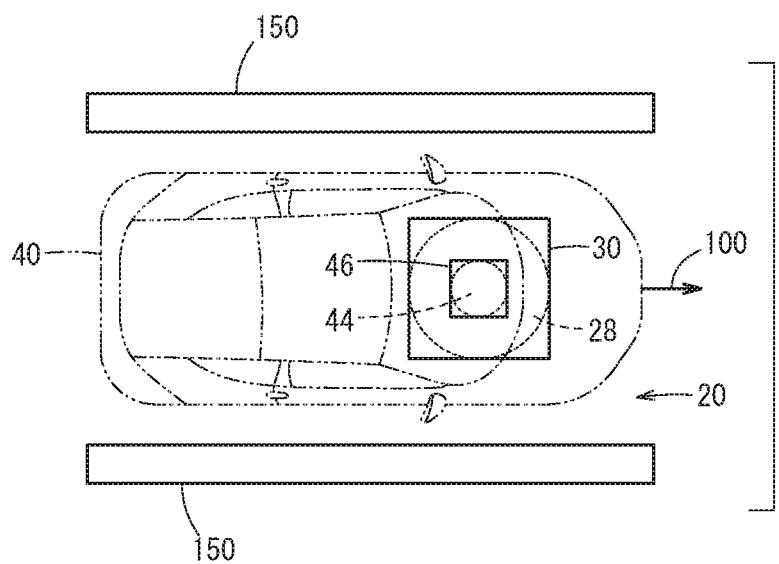
FIG. 7A is a state explanatory diagram that illustrates a state where the primary coil and the secondary coil are aligned.
Figure 8A:
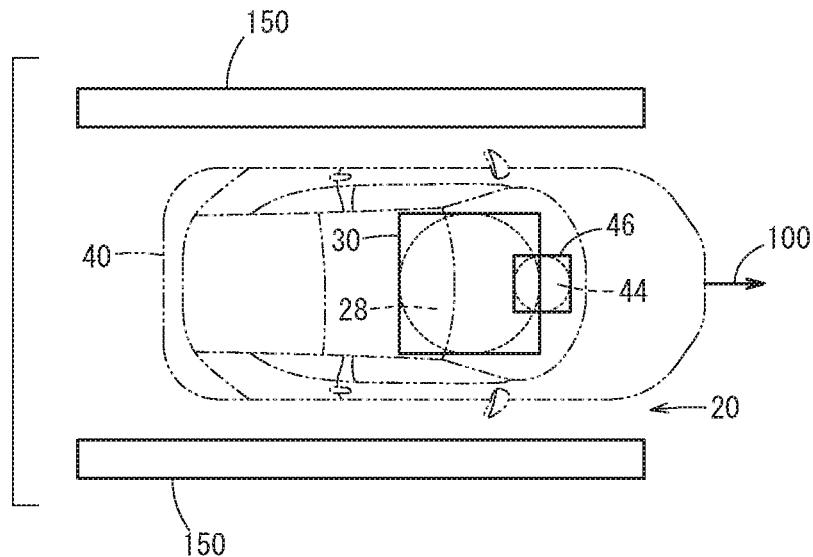
FIG. 8A is a state explanatory diagram that illustrates a state where the primary coil and the secondary coil are separating from each other.

In step S6, the tendency determination unit 64 performs a determination by using the positional derivative dV/dX. For example, as illustrated FIG. 6A, when the electric vehicle 40 travels to a direction to which an arrow 100 points and the primary coil 28 and the secondary coil 44 approach each other, the positional derivative dV/dX takes a positive value. In this case (step S6: positive), the process advances to step S7. In another example as illustrated in FIG. 7A, when the electric vehicle 40 travels to the direction to which the arrow 100 points and the primary coil 28 and the secondary coil 44 come to alignment with each other, the positional derivative dV/dX becomes zero. In this case (step S6: 0), the process advances to step S8. In still another example as illustrated in FIG. 8A, when the electric vehicle 40 travels to the direction to which the arrow 100 points and the primary coil 28 and the secondary coil 44 are separating from each other, the positional derivative dV/dX takes a negative value. In this case (step S6: negative), the process advances to step S9.

When the process has advanced from step S6 to step S7, the notification controller 68 outputs to the display device 76 and the acoustic device 78 the instruction signal that notifies that the primary coil 28 and the secondary coil 44 are approaching each other. As illustrated in FIG. 6B, the display device 76 displays on the screen 76a the icon 28a of the primary coil 28 and the icon 44a of the secondary coil 44 and moreover, the icon 110 indicating that the primary coil 28 and the secondary coil 44 are approaching each other. As illustrated in FIG. 6B, the acoustic device 78 outputs the electronic sound indicating that the primary coil 28 and the secondary coil 44 are approaching each other (for example, electronic sound with long intervals) from the speaker 78a. Then, the process advances to step S10.

Figure 7B:
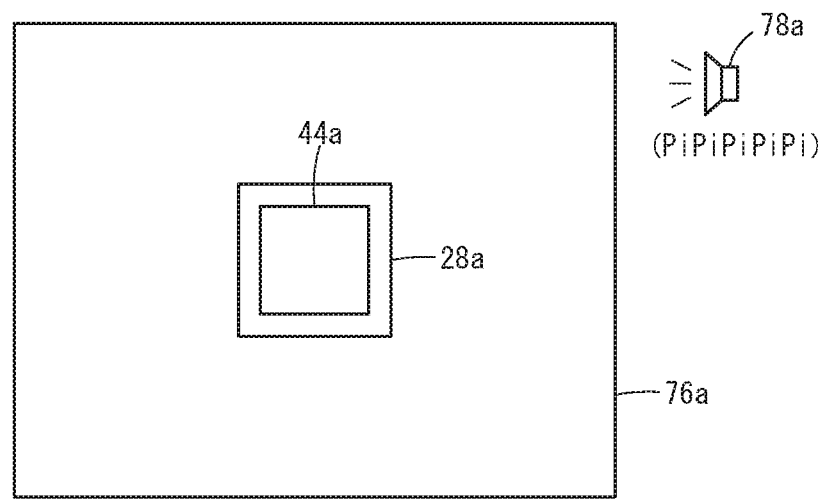
FIG. 7B is a schematic diagram that schematically represents a notification state in the state illustrated in the FIG. 7A.

When the process advances from step S6 to step S8, the notification controller 68 outputs to the display device 76 and the acoustic device 78 the instruction signal that notifies that the primary coil 28 and the secondary coil 44 are aligned. As illustrated in FIG. 7B, the display device 76 displays on the screen 76a the icon 28a of the primary coil 28 and the icon 44a of the secondary coil 44 in an overlapped manner. As illustrated in FIG. 7B, the acoustic device 78 outputs the electronic sound indicating that the primary coil 28 and the secondary coil 44 are aligned (for example, electronic sound with short intervals) from the speaker 78a. Then, the process advances to step S10.

Figure 8B:
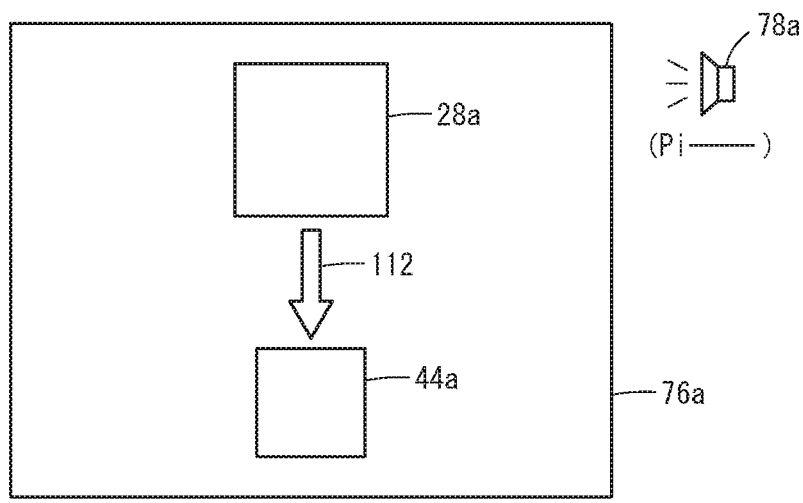
FIG. 8B is a schematic diagram that schematically represents a notification state in the state illustrated in the FIG. 8A.

When the process has advanced from step S6 to step S9, the notification controller 68 outputs to the display device 76 and the acoustic device 78 the instruction signal that notifies that the primary coil 28 and the secondary coil 44 are separating from each other. As illustrated in FIG. 8B, the display device 76 displays on the screen 76a the icon 28a of the primary coil 28 and the icon 44a of the secondary coil 44 and moreover, an icon 112 indicating that the primary coil 28 and the secondary coil 44 are separating from each other. As illustrated in FIG. 8B, the acoustic device 78 outputs the electronic sound indicating that the primary coil 28 and the secondary coil 44 are separating from each other (for example, continuous electronic sound) from the speaker 78a. Then, the process ends.

In step S10, the supervising unit 62 determines whether the alignment process is completed. After the alignment of the primary coil 28 and the secondary coil 44 is completed, the driver parks the electric vehicle 40. If an operation signal of a parking brake (not shown) or the like is detected, the supervising unit 62 determines that the alignment process is completed. In this case (step S10: YES), a series of processes ends. On the other hand, if the alignment process is not completed (step S10: NO), the process returns to step S5.

[4 Summary of Embodiment]

The non-contact power transmission system 10 according to the embodiment described above transmits power in a contactless manner from the primary coil 28 provided for the charging station 20 to the secondary coil 44 provided for the electric vehicle 40. The non-contact power transmission system 10 includes the primary side control unit 34 configured to transmit to the primary coil 28 the weak power for aligning the primary coil 28 and the secondary coil 44; the voltage detector 52 configured to detect the LPE voltage generated by the weak power that is received in the secondary coil 44; the tendency determination unit 64 configured to determine whether the voltage value V_LPE that changes as the electric vehicle 40 travels tends to increase or decrease; and the display device 76 and the acoustic device 78 (notification device) configured to perform the first notification if the voltage value V_LPE is larger than the second threshold V_LPEth2 (predetermined value) and tends to increase, and the second notification if the voltage value V_LPE is larger than the second threshold V_LPEth2 and tends to decrease.

According to the above structure, when the primary coil 28 and the secondary coil 44 are aligned, the first notification as illustrated in FIG. 6B is performed if the voltage value V_LPE generated by the weak power tends to increase, and the second notification as illustrated in FIG. 8B is performed if the voltage value V_LPE tends to decrease. Therefore, the alignment state where the primary coil 28 and the secondary coil 44 have been aligned can be let known without the calculation of the power transmission efficiency.

The non-contact power transmission system 10 further includes the distance sensor 80 configured to detect the travel distance X of the electric vehicle 40. The tendency determination unit 64 calculates, on the basis of the voltage value V_LPE detected by the voltage detector 52 and the travel distance X of the electric vehicle 40 detected by the distance sensor 80, the positional derivative dV/dX that is the amount of change of the voltage value V_LPE with respect to the infinitesimal travel distance, and determines whether the voltage value V_LPE tends to increase or decrease on the basis of the positional derivative dV/dX. According to the above structure, the tendency of change of the voltage value V_LPE can be judged through the simple procedure of, such as, calculating the positional derivative dV/dX of the voltage value V_LPE.

Furthermore, the non-contact power transmission system 10 according to the embodiment described above is as follows. That is to say, the non-contact power transmission system 10 includes: the primary side control unit 34 configured to transmit to the primary coil 28 the weak power for aligning the primary coil 28 and the secondary coil 44; the voltage detector 52 configured to detect the LPE voltage generated by the weak power that is received by the secondary coil 44; the distance sensor 80 configured to detect the travel distance X of the electric vehicle 40; the secondary side control unit 60 (tendency determination unit 64) configured to calculate, on the basis of the voltage value V_LPE detected by the voltage detector 52 and the travel distance X of the electric vehicle 40 detected by the distance sensor 80, the positional derivative dV/dX that represents the amount of change of the voltage value V_LPE with respect to the infinitesimal travel distance; and the display device 76 and the acoustic device 78 (notification device) configured to, if the voltage value V_LPE is larger than the second threshold V_LPEth2 (predetermined value), perform different notifications before and after the positional derivative dV/dX becomes zero.

By the above structure, when the primary coil 28 and the secondary coil 44 are aligned, the different notifications are performed before and after the voltage value V_LPE generated by the weak power takes the maximum value V_LPEmax. Therefore, the alignment of the primary coil 28 and the secondary coil 44 can be notified without the calculation of the power transmission efficiency.

Note that the non-contact power transmission system according to the present invention is not limited to the above embodiments, and various structures can be employed without departing from the concept of the present invention. For example, the non-contact power transmission system according to the present invention can be used for a vehicle equipped with a parking assist device or the automatic parking device (such as Japanese Laid-Open Patent Publication No. 2015-074266) that automatically performs at least one of steering, driving, and braking.

What is claimed is:

1. A non-contact power transmission system for transmitting power without contact from a primary coil that is provided for a charging station to a secondary coil that is provided for an electric vehicle, the system comprising:
   a primary side control unit configured to transmit to the primary coil a weak power for alignment of the primary coil and the secondary coil;
   a voltage detector configured to detect voltage generated by the weak power that is received by the secondary coil;
   a tendency determination unit configured to determine whether a value of the voltage that changes as the electric vehicle travels tends to increase or decrease; and
   a notification device configured to perform a first notification in response to determining that the value of the voltage is larger than a predetermined value and tends to increase, and a second notification in response to determining that the value of the voltage is larger than the predetermined value and tends to decrease,
   wherein the predetermined value is one of a plurality of local maximum values in characteristics representing a relation between the voltage detected by the voltage detector and a horizontal distance between the primary coil and the secondary coil, and the one of the plurality of local maximum values is not greatest among the plurality of local maximum values.

2. The non-contact power transmission system according to claim 1,
   the notification device comprising an acoustic device configured to output a first sound in response to determining that the value of the voltage tends to increase, and a second sound in response to determining that the value of the voltage tends to decrease.

3. The non-contact power transmission system according to claim 1,
   the notification device comprising a display device configured to output a first display if the value of the voltage tends to increase, and a second display if the value of the voltage tends to decrease.

4. The non-contact power transmission system according to claim 1, further comprising a distance sensor configured to detect a travel distance of the electric vehicle,
   wherein the tendency determination unit is configured to calculate, based on the value of the voltage detected by the voltage detector and the travel distance of the electric vehicle detected by the distance sensor, a positional derivative that represents an amount of change of the value of the voltage with respect to an infinitesimal travel distance, and determine whether the value of the voltage tends to increase or decrease based on the positional derivative.

5. A non-contact power transmission system for transmitting a charging power without contact from a primary coil that is provided for a charging station to a secondary coil that is provided for an electric vehicle, the system comprising:
   a primary side control unit configured to transmit to the primary coil a weak power for alignment of the primary coil and the secondary coil;
   a voltage detector configured to detect voltage generated by the weak power that is received by the secondary coil;
   a distance sensor configured to detect a travel distance of the electric vehicle;

a secondary side control unit configured to calculate, based on a value of the voltage detected by the voltage detector and the travel distance of the electric vehicle detected by the distance sensor, a positional derivative that represents an amount of change of the value of the voltage with respect to an infinitesimal travel distance; and a notification device configured to, in response to determining that the value of the voltage is larger than a predetermined value, perform different notifications before and after the positional derivative becomes zero, wherein the predetermined value is one of a plurality of local maximum values in characteristics representing a relation between the voltage detected by the voltage detector and a horizontal distance between the primary coil and the secondary coil, and the one of the plurality of local maximum values is not greatest among the plurality of local maximum values.

6. The non-contact power transmission system according to claim 1, wherein the one of the plurality of local maximum values is selected from the characteristics which produce greatest local maximum values among a plurality of characteristics.

7. The non-contact power transmission system according to claim 1, wherein the one of the plurality of local maximum values is a second greatest among the plurality of local maximum values.

* * * * *